(12) United States Patent
Mochizuki

(10) Patent No.: US 9,610,713 B2
(45) Date of Patent: Apr. 4, 2017

(54) GROOVED RESIN MOLDED PART

(71) Applicant: Polyplastics Co., Ltd., Tokyo (JP)

(72) Inventor: Akihiro Mochizuki, Fuji (JP)

(73) Assignee: POLYPLASTICS CO., LTD., Tokyo (JP)

( * ) Notice: Subject to any disclaimer, the term of this patent is extended or adjusted under 35 U.S.C. 154(b) by 0 days.

(21) Appl. No.: 14/766,835

(22) PCT Filed: Feb. 6, 2014

(86) PCT No.: PCT/JP2014/052801
§ 371 (c)(1),
(2) Date: Aug. 10, 2015

(87) PCT Pub. No.: WO2014/125999
PCT Pub. Date: Aug. 21, 2014

(65) Prior Publication Data
US 2015/0367538 A1    Dec. 24, 2015

(30) Foreign Application Priority Data

Feb. 12, 2013  (JP) ................... 2013-024459
Jun. 17, 2013  (JP) ................... 2013-127013

(51) Int. Cl.
*B29C 35/08*   (2006.01)
*B29C 45/14*   (2006.01)
(Continued)

(52) U.S. Cl.
CPC ........ *B29C 35/0805* (2013.01); *B23K 26/244* (2015.10); *B23K 26/324* (2013.01);
(Continued)

(58) Field of Classification Search
CPC ....... Y10T 428/23943; Y10T 428/2395; Y10T 428/2457; Y10T 428/24579;
(Continued)

(56) References Cited

U.S. PATENT DOCUMENTS 5,594,827 A * 1/1997 Joulie .................. G02B 6/4416
174/139
7,393,577 B2 * 7/2008 Day ......................... B32B 5/22
428/121
(Continued)

FOREIGN PATENT DOCUMENTS

DE         3903153           8/1990
DE      19523900 C1 *      1/1997   ......... B29C 37/0082
(Continued)

OTHER PUBLICATIONS

Machine translation transaltion of cited document DE 19523900, Jan. 1997.*

*Primary Examiner* — Donald J Loney
(74) *Attorney, Agent, or Firm* — Knobbe Martens Olson & Bear LLP

(57) ABSTRACT

A grooved resin molded part which when joined to another molded part, can form a composite molded product having an enhanced strength. This part contains an inorganic filler and has multiple grooves formed by partially removing the resin, such that the filler is exposed in these grooves. The depth of the grooves may be at least one-half of the length of the grooves in the shorter direction. The filler may have a fibrous shape; and the longer direction of the filler may be different from that of the grooves. The part is obtained by subjecting a resin molded part containing the filler to laser irradiation or the like to form multiple grooves in which the filler is exposed.

15 Claims, 12 Drawing Sheets

(51) Int. Cl.

| | | |
|---|---|---|
| *B29C 59/16* | (2006.01) | |
| *B29C 65/08* | (2006.01) | |
| *B29C 65/16* | (2006.01) | |
| *B29C 65/36* | (2006.01) | |
| *B29C 65/82* | (2006.01) | |
| *B29C 65/00* | (2006.01) | |
| *B23K 35/36* | (2006.01) | |
| *B23K 26/364* | (2014.01) | |
| *B23K 26/402* | (2014.01) | |
| *B23K 26/324* | (2014.01) | |
| *B23K 26/244* | (2014.01) | |
| *B29K 105/12* | (2006.01) | |
| *B29K 105/16* | (2006.01) | |
| *B29L 31/00* | (2006.01) | |
| *B23K 103/00* | (2006.01) | |
| *B23K 103/16* | (2006.01) | |

(52) U.S. Cl.
CPC .......... *B23K 26/364* (2015.10); *B23K 26/402* (2013.01); *B23K 35/3613* (2013.01); *B29C 45/14811* (2013.01); *B29C 59/16* (2013.01); *B29C 65/08* (2013.01); *B29C 65/1616* (2013.01); *B29C 65/1635* (2013.01); *B29C 65/1654* (2013.01); *B29C 65/1683* (2013.01); *B29C 65/3648* (2013.01); *B29C 65/8253* (2013.01); *B29C 66/0246* (2013.01); *B29C 66/1122* (2013.01); *B29C 66/1222* (2013.01); *B29C 66/1224* (2013.01); *B29C 66/1282* (2013.01); *B29C 66/12841* (2013.01); *B29C 66/14* (2013.01); *B29C 66/304* (2013.01); *B29C 66/3022* (2013.01); *B29C 66/3034* (2013.01); *B29C 66/30325* (2013.01); *B29C 66/41* (2013.01); *B29C 66/45* (2013.01); *B29C 66/53461* (2013.01); *B29C 66/54* (2013.01); *B29C 66/712* (2013.01); *B29C 66/72143* (2013.01); *B29C 66/7392* (2013.01); *B29C 66/81267* (2013.01); *B29C 66/81431* (2013.01); *B29C 66/8322* (2013.01); *B23K 2203/16* (2013.01); *B23K 2203/42* (2015.10); *B29C 66/026* (2013.01); *B29C 66/21* (2013.01); *B29C 66/71* (2013.01); *B29C 66/7212* (2013.01); *B29C 66/7394* (2013.01); *B29C 66/73753* (2013.01); *B29C 66/73921* (2013.01); *B29C 66/73941* (2013.01); *B29C 66/939* (2013.01); *B29C 2035/0838* (2013.01); *B29C 2791/009* (2013.01); *B29K 2105/122* (2013.01); *B29K 2105/16* (2013.01); *B29L 2031/756* (2013.01); *Y10T 428/2395* (2015.04); *Y10T 428/23943* (2015.04); *Y10T 428/2457* (2015.01); *Y10T 428/2462* (2015.01); *Y10T 428/24579* (2015.01); *Y10T 428/249941* (2015.04); *Y10T 428/249946* (2015.04)

(58) Field of Classification Search
CPC ..... Y10T 428/2462; Y10T 428/249941; Y10T 428/249946; B23K 26/324; B23K 26/364; B29C 65/70; B29C 65/1654; B29C 65/08; B29C 65/1683; B29C 65/8253; B29C 66/1122; B29C 66/1224; B29C 66/30325; B29C 66/41; B29C 66/81267; B29C 66/8322

See application file for complete search history.

(56) References Cited

U.S. PATENT DOCUMENTS

| | | | |
|---|---|---|---|
| 7,694,479 B2 * | 4/2010 | Killen | ................ A47B 96/202 |
| | | | 52/309.12 |
| 2007/0075050 A1 | 4/2007 | Heyl | |
| 2009/0010603 A1* | 1/2009 | Sugioka | ................ C08K 3/22 |
| | | | 385/123 |
| 2011/0081514 A1* | 4/2011 | Day | ................ B29C 70/086 |
| | | | 428/53 |
| 2011/0177286 A1 | 7/2011 | Maier et al. | |

FOREIGN PATENT DOCUMENTS

| | | |
|---|---|---|
| DE | 101 02 853 | 8/2002 |
| DE | 10 2004 039 132 | 3/2006 |
| JP | H1-126339 A | 5/1989 |
| JP | H3-203291 A | 9/1991 |
| JP | H9-314669 A | 12/1997 |
| JP | 2000-351189 A | 12/2000 |
| JP | 2002-11795 A | 1/2002 |
| JP | 2011-079289 A | 4/2011 |
| JP | 2011-529404 A | 12/2011 |
| JP | 2011-207760 A | 10/2012 |

* cited by examiner

SCHEMATIC ILLUSTRATION FOR OBTAINING THE COMPOSITE MOLDED ARTICLE 1 BY MULTIPLE MOLDING (1) PERFORM PRIMARY MOLDING OF A PRIMARY RESIN (2) FABRICATE THE GROOVE 12

(3) PERFORM SECONDARY MOLDING BY PLACING THE GROOVED RESIN MOLDED ARTICLE 10 INTO A MOLD (NOT SHOWN), AND THEN ADDING A SECONDARY RESIN.

SCHEMATIC ILLUSTRATION FOR OBTAINING THE
COMPOSITE MOLDED ARTICLE 1 BY ULTRASONIC WELDING (1) BRING THE TIP 21 OF THE ANOTHER RESIN MOLDED ARTICLE 20 CLOSE
TO THE GROOVE 12 OF THE GROOVED RESIN MOLDED ARTICLE 10.

(2) PERFORM ULTRASONIC WELDING TO OBTAIN THE COMPOSITE
MOLDED ARTICLE 1.

SCHEMATIC ILLUSTRATION FOR OBTAINING THE
COMPOSITE MOLDED ARTICLE 1 BY LASER WELDING.

(1) OVERLAY THE ANOTHER MOLDED ARTICLE 20 ON THE GROOVED
RESIN MOLDED ARTICLE 10 SO THAT THEY FACE EACH OTHER.

(2) APPLY CLAMP PRESSURE OVER THE ANOTHER MOLDED ARTICLE 20.

(3) IRRADIATE THE ANOTHER RESIN MOLDED ARTICLE 20 WITH
LASER FROM ABOVE.

SCHEMATIC ILLUSTRATION FOR OBTAINING THE COMPOSITE MOLDED ARTICLE 1 BY HIGH-FREQUENCY INDUCTION HEATING WELDING (1) MOUNT THE HEATING ELEMENT 40 ON THE GROOVED RESIN MOLDED ARTICLE 10, AND THEN FURTHER MOUNT THE ANOTHER MOLDED ARTICLE 20.

(2) APPLY CLAMP PRESSURE OVER THE ANOTHER MOLDED ARTICLE 20.

(3) APPLY HIGH-FREQUENCY TO THE ANOTHER RESIN MOLDED ARTICLE 20 FROM ABOVE.

SEM IMAGES OF THE GROOVED RESIN MOLDED ARTICLES ACCORDING TO EXAMPLE 1 (COMPARISON OF RESINS)

SEM IMAGES OF THE GROOVED RESIN MOLDED ARTICLES ACCORDING TO EXAMPLE 2 (COMPARISON OF NUMBER OF TIMES OF LASER IRRADIATION) (GROOVED RESIN MOLDED ARTICLES: LCP WITH GLASS FIBER)

SEM IMAGES OF THE GROOVED RESIN MOLDED ARTICLES ACCORDING TO EXAMPLE 3 (COMPARISON OF SHAPES OF GROOVE)
(GROOVED RESIN MOLDED ARTICLES: LCP WITH GLASS FIBER, NUMBER OF TIMES OF LASER IRRADIATION: 10 TIMES)

FIG. 11

SEM IMAGES OF THE GROOVED RESIN MOLDED ARTICLES ACCORDING TO EXAMPLE 4(COMPARISON OF DISTANCE BETWEEN GROOVES, NO. 1) (GROOVED RESIN MOLDED ARTICLES: LCP WITH GLASS FIBER, NUMBER OF TIMES OF LASER IRRADIATION: 10 TIMES, SHAPE: DIAGONAL GRID-LIKE)

| | MAGNIFICATION: 20 TIMES | MAGNIFICATION: 100 TIMES | MAGNIFICATION: 300 TIMES |
|---|---|---|---|
| EXAMPLE 4-1 VALLEY:200μm CREST:50μm VALLEY:CREST= 1:0.25 | 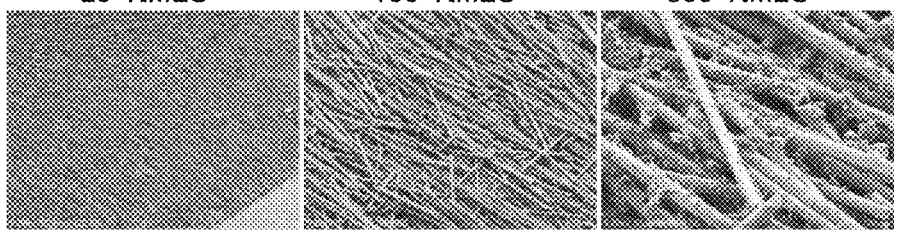 | | |
| EXAMPLE 4-2 VALLEY:200μm CREST:100μm VALLEY:CREST= 1:0.5 | 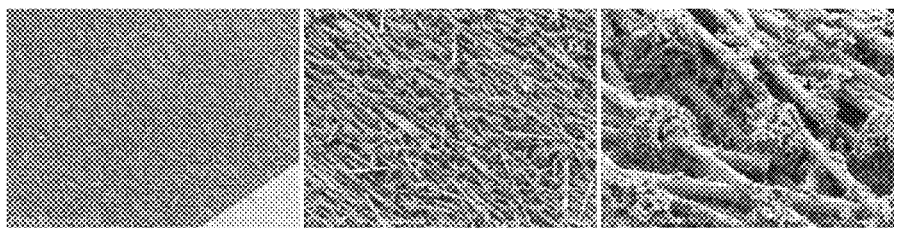 | | |
| EXAMPLE 4-3 VALLEY:200μm CREST:150μm VALLEY:CREST= 1:0.75 | 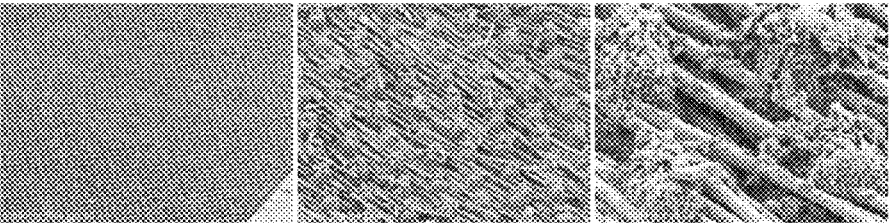 | | |
| EXAMPLE 4-4 VALLEY:200μm CREST:200μm VALLEY:CREST= 1:1 | 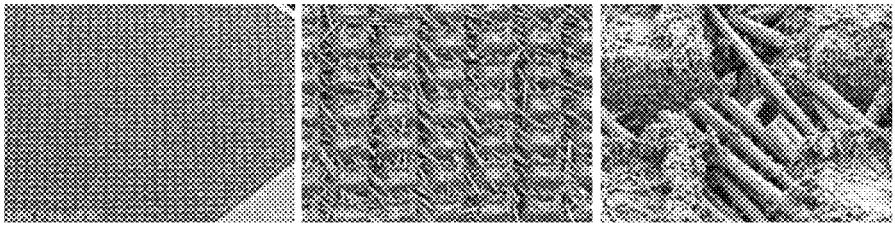 | | |

FIG. 12
SEM IMAGES OF THE GROOVED RESIN MOLDED ARTICLES ACCORDING TO
EXAMPLE 5 (COMPARISON OF DISTANCE BETWEEN GROOVES, NO. 1)
(GROOVED RESIN MOLDED ARTICLES: LCP WITH GLASS FIBER, NUMBER OF
TIMES OF LASER IRRADIATION: 10 TIMES, SHAPE: TRANSVERSE DIRECTION)

| | MAGNIFICATION: 20 TIMES | MAGNIFICATION: 100 TIMES | MAGNIFICATION: 300 TIMES |
|---|---|---|---|
| EXAMPLE 5-1<br>VALLEY: 200 μm<br>CREST: 50 μm<br>VALLEY:CREST=<br>1:0.25 | 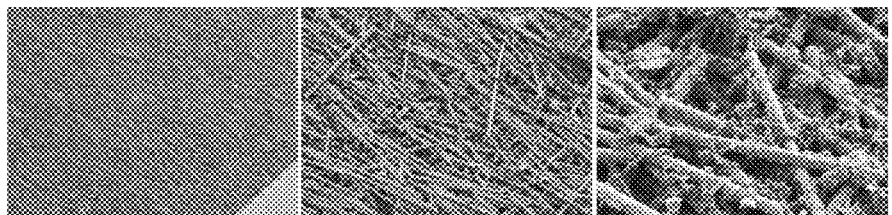 | | |
| EXAMPLE 5-2<br>VALLEY: 200 μm<br>CREST: 100 μm<br>VALLEY:CREST=<br>1:0.5 | 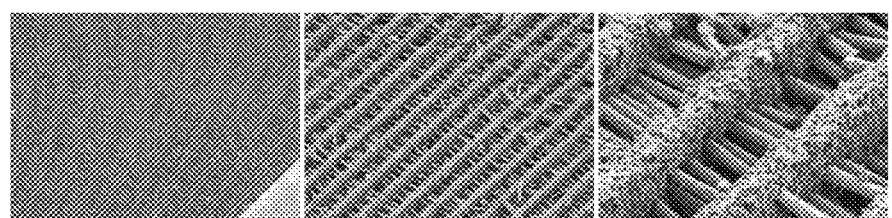 | | |
| EXAMPLE 5-3<br>VALLEY: 200 μm<br>CREST: 150 μm<br>VALLEY:CREST=<br>1:0.75 | 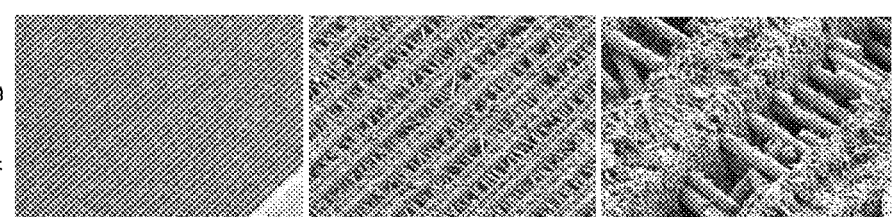 | | |
| EXAMPLE 5-4<br>VALLEY: 200 μm<br>CREST: 200 μm<br>VALLEY:CREST=<br>1:1 | 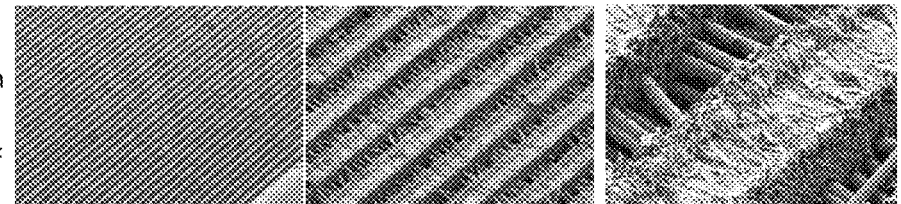 | | |
| EXAMPLE 5-5<br>VALLEY: 200 μm<br>CREST: 300 μm<br>VALLEY:CREST=<br>1:1.5 | 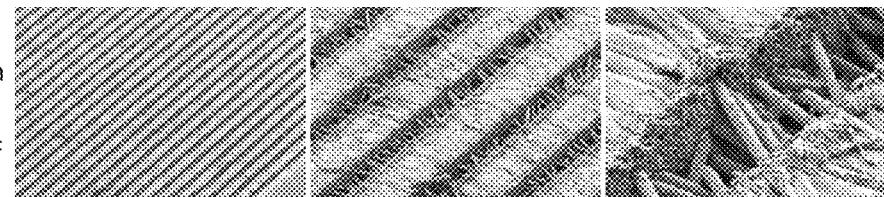 | | |
| EXAMPLE 5-6<br>VALLEY: 200 μm<br>CREST: 400 μm<br>VALLEY:CREST=<br>1:2 |  | | |

GROOVED RESIN MOLDED PART

This application is the U.S. National Phase under 35 U.S.C. §371 of International Application PCT/JP2014/052801, filed Feb. 6, 2014, designating the U.S., and published in Japanese as WO 2014/125999 on Aug. 21, 2014, which claims priority to Japanese Patent Application No. 2013-024459, filed Feb. 12, 2013; and Japanese Patent Application No. 2013-127013, filed Jun. 17, 2013, the entire contents of which are incorporated herein by reference.

TECHNICAL FIELD

The present invention relates to a grooved resin molded article, a composite molded article comprising the above grooved resin molded article and a method of manufacturing these. The present invention also relates to a method of observing a surface of the above grooved resin molded article.

BACKGROUND ART

In recent years, in the fields of automobiles, electronic products, industrial equipment and the like, there is an increasing trend where a portion of a metal molded article is replaced with a resin molded article in order to respond to the demands of reducing carbon dioxide emission, manufacturing costs and the like. In connection with this, composite molded articles are widely used in which resin molded articles are integrated with metal molded articles. Without limited to this, composite molded articles in which molded articles of similar or dissimilar materials are integrated together are also widely used.

Further, a resin material filled with an inorganic filler such as glass fiber is often used, and the orientation of the inorganic filler upon molding the material is often an issue. Therefore, various methods of observing an inorganic filler are used.

As a method of manufacturing a composite molded article in which one molded article is integrated with another molded article, the following have been proposed, for example. Patent Document 1 proposes a method comprising: mixing a filler such as glass fiber with one resin to perform molding; subjecting the other resin to chemical, plasma, flame treatments and the like to remove a resin with a thickness of one severalth of micrometers to tens of micrometers; and then performing filling and molding while the other resin is allowed to make contact with a surface for adhering the other resin, thereby achieving adhesion. Further, Patent Document 2 proposes a method comprising: irradiating a surface of one resin molded article with electromagnetic radiation to form a nano structure in the above surface; and then performing filling and molding while the other resin molded article is allowed to make contact with the above surface, thereby achieving integration Further, the following are also commonly performed: a resin is observed after removing a surface resin of a resin molded article to expose an inorganic filler by cutting, grinding the surface, or treating the surface with a chemical and the like; and an inorganic filler inside a resin molded article is observed with an X-ray CT.

Patent Document 1: Japanese Unexamined Patent Application, Publication No. H01-126339

Patent Document 2: Japanese Unexamined Patent Application (Translation of PCT Application), Publication No. 2011-529404

DISCLOSURE OF THE INVENTION

Problems to be Solved by the Invention

Nonetheless, there exists a room for further improving the strength of the one molded article joined with another molded article. Further, there exist rooms for further improving the ease of observing an inorganic filler contained in a resin molded article.

The present invention is made to solve the above problems. An object of the present invention is to provide a resin molded article capable of further enhancing the strength thereof when joined with another molded article. Another object of the present invention is to provide a method of conveniently observing an inorganic filler present close to a surface of a resin molded article.

Means for Solving the Problems

The present inventors have conducted extensive studies to achieve the above objects. As a result, the present inventors find that multiple grooves with an inorganic filler exposed thereon which are formed by removing a portion of resin in a resin molded article containing the inorganic filler can serve as an anchor where the inorganic filler exposed at the grooves can prevent destruction of a grooved resin molded article and another molded article when the grooved resin molded article is joined with the another molded article, leading to the significantly enhanced strength of a composite molded body. Moreover, the present inventors find that the orientation of an inorganic filler present close to a surface of a molded article surface can be easily observed while preventing detachment of the inorganic filler by decreasing the distance between adjacent grooves as small as possible. Specifically, the present invention provides the following.

(1) The present invention is a grooved resin molded article containing an inorganic filler and comprising at least one groove in which the inorganic filler is exposed.

(2) Further, the present invention is the grooved resin molded article according to (1), wherein the inorganic filler is projected from a surface at a side of the at least one groove.

(3) Further, the present invention is the grooved resin molded article according to (1) or (2), wherein the depth of the at least one groove is ½ or more of the length of the at least one groove in the shorter direction.

(4) Further, the present invention is the grooved resin molded article according to any one of (1) to (3), wherein the inorganic filler comprises a fibrous inorganic filler.

(5) Further, the present invention is the grooved resin molded article according to (4), wherein the fibrous inorganic filler is glass fiber.

(6) Further, the present invention is the grooved resin molded article according to any one of (1) to (5), wherein the inorganic filler bridges protrusions present at the both sides of the at least one groove.

(7) Further, the present invention is the grooved resin molded article according to any one of (1) to (6), wherein the longer direction of the inorganic filler is different from that of the at least one groove, and the length of the at least one groove in the shorter direction is shorter than that of the inorganic filler in the longer direction.

(8) Further, the present invention is the grooved resin molded article according to any one of (1) to (7), wherein the at least one groove is in a plurality of numbers, and the distance between adjacent grooves is 1 time or more and 2 times or less of the width of the at least one groove.

(9) Further, the present invention is the grooved resin molded article according to any one of (1) to (8), wherein the at least one groove is formed by laser irradiation.

(10) Further, the present invention is the grooved resin molded article according to any one of (1) to (9), wherein the at least one groove is intermittently formed.

(11) Further, the present invention is a composite molded article, wherein another molded article is adjoined on a surface having the at least one groove of the grooved resin molded article according to any one of (1) to (10).

(12) Further, the present invention is the composite molded article according to (11), wherein the another molded article is arranged to surround the inorganic filler in the inside of the at least one groove.

(13) Further, the present invention is a method of manufacturing a grooved resin molded article, the method comprising a groove forming step of performing partial removal of a resin in a resin molded article containing an inorganic filler to form at least one groove in which the inorganic filler is exposed from a side surface thereof.

(14) Further, the present invention is the method of manufacturing a grooved resin molded article according to (13), where the at least one groove is in a plurality of numbers.

(15) Further, the present invention is the method of manufacturing a grooved resin molded article according to (13) or (14), wherein the partial removal of a resin is performed by laser irradiation.

(16) Further, the present invention is the method of manufacturing a grooved resin molded article according to (15), wherein the laser irradiation is repeated for multiple times in the groove forming step.

(17) Further, the present invention is the method of manufacturing a grooved resin molded article according to (16), comprising a step of increasing the level of laser irradiation relative to the previous irradiation level when the laser irradiation is repeated for multiple times.

(18) Further, the present invention is the method of manufacturing a grooved molded article according to any one of (15) to (17), wherein the laser irradiation is performed from a direction other than that perpendicular to a surface of the molded article.

(19) Further, the present invention is the method of manufacturing a grooved resin molded article according to any one of (13) to (18), wherein the inorganic filler comprises a fibrous inorganic filler, and the length of the fibrous inorganic filler in the longer direction is longer than that of the at least one groove in the shorter direction, and the at least one groove having a width shorter than the length of the fibrous inorganic filler in the longer direction is formed in a direction different from the longer direction of the fibrous inorganic filler in the groove forming step.

(20) Further, the present invention is the method of manufacturing a grooved resin molded article according to (19), wherein the fibrous inorganic filler is glass fiber.

(21) Further, the present invention is the method of manufacturing a grooved resin molded article according to any one of (13) to (20), wherein the at least one groove is formed apart by a distance of 1 time or more and 2 times or less of the width of the at least one groove in the groove forming step.

(22) Further, the present invention is a method of manufacturing a composite molded article, the method comprising preparing a grooved resin molded article using the method of manufacturing a grooved resin molded article according to any one of (13) to (21), and then integrating the grooved resin molded article with another molded article through a surface having the at least one groove arranged as a contact surface to manufacture the composite molded article.

(23) Further, the present invention is the method of manufacturing a composite molded article according to (22), wherein the integration is performed by injection molding.

(24) Further, the present invention is a method of observing a surface of a grooved resin molded article, the method comprising observing a surface having the at least one groove of the grooved resin molded article according to any one of (1) to (10).

(25) Further, the present invention is a method of observing the surface of a grooved resin molded article according to (24), wherein the multiple grooves are formed in a grid-like pattern so that the distance between adjacent grooves is 150 µm or less, or the multiple grooves are formed linearly in one direction so that the distance between adjacent grooves is 50 µm or less.

(26) Further, the present invention is a method of observing a surface of a grooved resin molded article, the method comprising preparing a grooved resin molded article using the method of manufacturing a grooved resin molded article according to any one of (13) to (21), and then observing a surface having the at least one groove.

Effects of the Invention

In a case where the grooved resin molded article according to the present invention is used in a composite molded article along with another molded article, an inorganic filler exposed at a groove serves as an anchor for preventing destruction of the grooved resin molded article and the another molded article when joining the grooved resin molded article with the another molded article, leading to the significantly enhanced strength of the composite molded article. In this case, a somewhat larger distance is preferred between adjacent grooves in order to sufficiently achieve the anchor effect.

Further, the grooved resin molded article according to the present invention can also be used to observe an exposure condition of the inorganic filler. In this case, a distance as small as possible is preferred between adjacent grooves as long as the inorganic filler is not detached.

BRIEF DESCRIPTION OF THE DRAWINGS

FIG. 11 shows SEM images of the grooved resin molded articles according to Example 4 (comparison of the distance between grooves, No. 1).

FIG. 12 shows SEM images of the grooved resin molded articles according to Example 5 (comparison of the distance between grooves, No. 2).

PREFERRED MODE FOR CARRYING OUT THE INVENTION

Below, embodiments of the present invention will be described in detail, but the present invention shall not in any way be limited to the following embodiments. Modifications may be appropriately made within the scope of the object of the present invention. Note that descriptions may appropriately be omitted for redundant parts, but this shall not limit the sprite of the present invention.

Grooved Resin Molded Article 10

Figure 1:
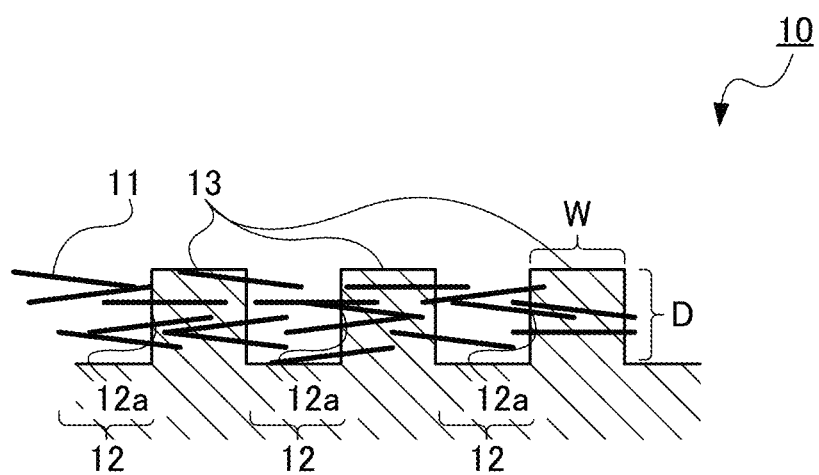
FIG. 1 shows a schematic view of a grooved resin molded article 10 according to the present invention in an enlarged schematic cross section.

FIG. 1 shows a schematic view of the grooved resin molded article 10 according to the present invention in a enlarged schematic cross section. The grooved resin molded article 10 contains an inorganic filler 11, and a groove 12 is formed in which the inorganic filler 11 is exposed.

[Resin]

There is no particular limitation for the type of the resin as long as a groove can be formed by a resin removing means such as laser irradiation or a chemical treatment. Those in which a groove can be formed by laser irradiation can include, for example, polyphenylene sulfide (PPS), liquid crystal polymer (LCP), polybutylene terephthalate (PBT), polyacetal (POM) and the like.

Chemical treatments include decomposition treatments with an acid or an alkali, dissolution treatments with a solvent and the like. An amorphous thermoplastic resin can be dissolved easily in various solvents. For a crystalline resin, amphiprotic solvents may be selectively used. Those in which a groove can be formed by adding an acid or an alkali can include polybutylene terephthalate (PBT), polyacetal (POM) and the like. When performing a chemical treatment, it is important to limit the chemical treatment to a groove forming region, and to remove products resulted from the chemical treatment.

The resin may be thermoplastic or thermosetting.

[Inorganic Filler 11]

There is no particular limitation for the inorganic filler 11 as long as it is exposed at a groove when the groove is formed by removing a portion of a resin in a resin molded article.

Examples of the inorganic filler 11 can include glass fiber, carbon fiber, whisker fiber, glass flake, mica, talc and the like. Among these, the inorganic filler 11 is preferably glass fiber in view of that it is more laser-transmittable, and laser is less likely blocked by the fiber when a groove is formed by laser irradiation, and in addition to these, it is inexpensive. In order to prevent detachment of the inorganic filler 11 from a composite molded article (1 in FIG. 2) and to allow the inorganic filler 11 to serve as an anchor for preventing separation of the grooved resin molded article 10 and another molded article (20 in FIG. 2), the inorganic filler 11 is preferably projected from a side surface 12a of the groove 12, and the length of the inorganic filler 11 in the longer direction is preferably longer than that of the groove 12 in the shorter direction. In other words, the length of the groove 12 in the shorter direction is preferably shorter than that of the inorganic filler 11 in the longer direction. In a case where the shape is fibrous, the mean fiber length is preferably longer than the length of the groove 12 in the shorter direction. In a case where the shape is amorphous, plate-like or particle-like, the longer diameter, preferably the mean particle diameter is preferably longer than the length of the groove 12 in the shorter direction.

In the present invention, considering that the inorganic filler 11 exposed at the groove 12 effectively serves as an anchor for preventing destruction of the grooved resin molded article 10 and the another molded article 20, the shape of the inorganic filler 11 is preferably fibrous in view of that it can suitably bridge protrusions 13 of pits and projections formed, for example, by removing a portion of a resin. The pits and projections correspond to laser-irradiated regions and un-irradiated regions, respectively.

There is no particular limitation for the content of the inorganic filler 11, but it is preferably from 5 parts by weight to 80 parts by weight relative to 100 parts by weight of the resin. When the content is less than 5 parts by weight, the inorganic filler 11 may not be able to fully serve as an anchor for preventing destruction of the grooved resin molded article 10 and the another molded article 20 even in a case where the inorganic filler 11 is exposed at the groove 12. When the content is more than 80 parts by weight, the grooved resin molded article 10 may not have sufficient strength.

[Commercially Available Products Suitable for Resin Material in which Inorganic Filler 11 Will be Contained]

Commercially available products of resin materials in which the inorganic filler 11 will be contained can include PPS with glass fiber (Product name: Durafide PPS 1140A7, Polyplastics Co., Ltd), PPS with glass fiber•inorganic filler (Product name: Durafide PPS 6165A7, Polyplastics Co., Ltd), LCP with glass fiber (Product name: Vectra LCP E130i, Polyplastics Co., Ltd.) and the like.

[Groove 12]

Multiple grooves 12 are formed in a surface of the resin molded article 10. The inorganic filler 11 is exposed at these multiple grooves 12. The inorganic filler 11 can be exposed such that the inorganic filler 11 is projected from the side surface 12a of the groove 12 by removing a portion of a resin to form the groove 12. The multiple grooves 12 may be such that each groove is individually formed, or such that a groove having multiple pits and projections is drawn in one stroke.

Meanwhile, in the present invention, after a composite molded article (1 in FIG. 2) is manufactured by integrating the grooved resin molded article 10 with another molded article (20 in FIG. 2) through a surface having the groove 12 of the grooved resin molded article 10 arranged as a contact surface, the inorganic filler 11 is not exposed in the composite molded article 1. As used herein, even in a case where the inorganic filler 11 is not exposed in the composite molded article 1, "the inorganic filler 11 is considered to be exposed at the multiple grooves 12," if the inorganic filler 11 is exposed from the grooves 12 when the another molded article 20 is removed from the composite molded article 1.

The longer direction of the groove 12 is preferably different from that of the inorganic filler 11. In a case where the longer direction of the groove 12 is the same as that of the inorganic filler 11, the inorganic filler 11 may not be able to bridge the protrusions 13 of pits and projections formed, for example, by removing a portion of a resin, the pits and projections corresponding to laser-irradiated regions and un-irradiated regions, respectively. As a result, the inorganic filler 11 may be more easily detached from the grooved resin molded article 10, and the inorganic filler may not be able to serve as an anchor for preventing destruction of the grooved resin molded article 10 and the another molded article 20, and the inorganic filler may not be correctly observed.

When the multiple grooves 12 are formed on a surface of the resin molded article 10, the anchor effect may be further enhanced. The multiple grooves 12 may be formed as one groove adjacently coming and going, or may be formed in multiple grooves.

The multiple grooves 12 may be provided such that the grooves 12 each connected at the both ends are aligned like a contour line, or may be formed in a stripe-like pattern where the grooves 12 are not crossed, or may be formed in a grid-like pattern where the grooves 12 are crossed. In a case where the grooves 12 are formed in a grid-like pattern, they are preferably formed in a diagonal grid-like pattern where the longer direction of the groove 12 is different from that of the inorganic filler. Further, in a case where the grooves 12 are formed in a grid-like pattern, they may be formed in a rhombo-like pattern as in Example 3-3 in FIG. 9.

There is no particular limitation for the length of the groove 12, and the shape of an opening may be rectangular, or may be circular or elliptical when the groove 12 is short. The groove 12 is preferably long in order to obtain the anchor effect.

Meanwhile, the following uses of the grooved resin molded article 10 according to the present invention can be envisioned: a use in a composite molded article along with another molded article; a use for observing an exposure condition of an inorganic filler. When used in a composite molded article, in order to fully obtain the anchor effect, the distance W between the adjacent grooves 12 is preferably from 0.75 times to 4 times of the width of the groove, i.e., from 150 µm to 800 µm when the width of the groove is 200 µm, and more preferably from 1 time to 2 times of the width of the groove, i.e., from 200 µm to 400 µm when the width of the groove is 200 µm. In a case where the distance is 0.75 times of the width of the groove, i.e., 150 µm or less when the width of the groove is 200 µm, the inorganic filler 11 can not fully serve as an anchor for preventing destruction of the grooved resin molded article 10 and the another molded article 20, and the grooved resin molded article 10 may be destroyed by a small external force when an external force is applied to the composite molded article 1 in a case where the composite molded article 1 is formed by joining the grooved resin molded article 10 with the another molded article 20 through the groove 12. In a case where the distance is 4 times of the width of the groove, i.e., more than 800 µm when the width of the groove is 200 µm, the inorganic filler 11 can not serve as an anchor for preventing destruction of the another molded article 20, and the another molded article 20 may be destroyed by a small external force when an external force is applied to the another molded article 20 in a case where the composite molded article 1 is formed by joining the grooved resin molded article 10 with the another molded article 20 through the groove 12.

In contrast, in a case where an exposure condition of an inorganic filler is observed, the distance W between adjacent grooves 12 is preferably shorter within a range where the inorganic filler is not detached in view of that the content of a residual resin on a surface of a molded article is smaller, and the inorganic filler may be observed easily. Specifically, the distance W between adjacent grooves 12 is preferably 150 µm or less in a case where the shape of the groove is a diagonal grid, more preferably 50 µm or less in a case where it is a one-directional line.

Further, the depth D of the groove 12 is such that the inorganic filler 11 can be observed, but it is preferably ½ or more of the length of the grove in the shorter direction in a composite molded article. In a case where the depth is less than ½ of the length of the groove 12 in the shorter direction, the grooved resin molded article 10 may not be closely joined firmly with the another molded article 20 since a sufficient anchor effect may not be obtained between the inorganic filler exposed at the groove 12 and the another molded article 20 in a case where the composite molded article 1 is formed by joining the grooved resin molded article 10 with the another molded article 20 through the groove 12.

Further, the distance between adjacent grooves 12 is preferably from 1 time to 2 times of the width of the groove 12 in a composite molded article for which strong joint strength is required. In a case where the width of the groove 12 is too narrow, the inorganic filler 11 can not fully serve as an anchor for preventing destruction of the another molded article 20, and the another molded article 20 may be destroyed when an external force is applied to the composite molded article 1 in a case where the composite molded article 1 is formed by joining the grooved resin molded article 10 with the another molded article 20 through the groove 12. In a case where the distance between adjacent grooves 12 is too narrow, the inorganic filler 11 can not fully serve as an anchor for preventing destruction of the grooved resin molded article 10, and the grooved resin molded article 10 may be destroyed when an external force is applied to the composite molded article 1 in a case where the composite molded article 1 is formed by joining the grooved resin molded article 10 with the another molded article 20 through the groove 12. Such distance between grooves may also be effective when provided at a region where a strong joint strength is required.

Method of Manufacturing Grooved Resin Molded Article 10

The grooved resin molded article 10 can be obtained by performing laser irradiation or a chemical treatment on a resin molded article containing the inorganic filler 11 to remove a portion of the resin, thereby forming multiple grooves where the inorganic filler 11 is exposed.

Laser irradiation is set up based on the type of a target material for irradiation, the output of a laser device and the like. If a resin is not irradiated with appropriate energy to form a groove, an inorganic filler may not be sufficiently exposed, or a groove with a desired width and depth may be difficult to be formed. Therefore, irradiation is preferably performed in multiple separated doses.

Meanwhile, an inorganic filler partly blocks the energy of laser. Therefore, in a case where laser irradiation is performed for multiple times to deeply remove a resin, more energy is absorbed as irradiation is repeated because laser hits the inorganic filler already exposed. Therefore, higher energy needs to be given by that amount. Therefore, when repeating laser irradiation for multiple times, a step of increasing the level of laser irradiation as compared with the previous irradiation level is preferably included.

There is no particular limitation for the type of inorganic filler, but it is preferably glass fiber in view of that glass fiber shows less shielding effects of laser irradiation to allow easy removal of a resin, and it can readily bridge between the both side surfaces of a groove in a suitable manner.

Further, in order to remove a resin present in the back side of an inorganic filler having low laser beam transmissibility, laser irradiation is preferably performed from a different direction in addition to a commonly used direction perpendicular to a surface of a molded article.

When performing a chemical treatment, an acid, an alkali, an organic solvent or the like is selectively used depending on the properties of a resin. In the case of a polyacetal resin molded article in which the resin is to be decomposed by an acid, a groove can be formed by performing decomposition and removal with an acid at a place for providing a groove. In the case of an amorphous resin molded article which readily melts in an organic solvent, a groove can be formed by pre-masking a place other than that for providing a groove on a surface of a molded article, and then performing dissolution and removal with an organic solvent.

Composite Molded Article 1

Figure 2:
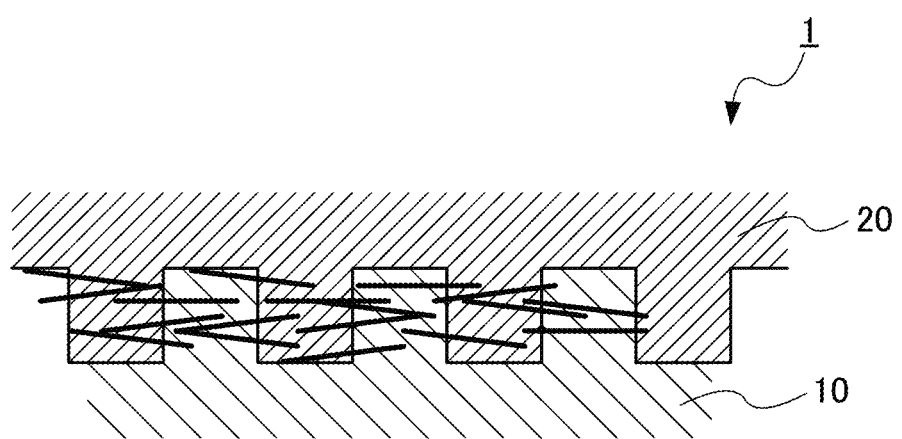
FIG. 2 shows a schematic view of a composite molded article 1 according to the present invention in an enlarged schematic cross section.

FIG. 2 shows a schematic view of the composite resin molded article 1 according to the present invention in a enlarged schematic cross section. In the composite molded article 1, the another molded article 20 is adjoined on a surface having the groove 12 of the grooved resin molded article 10. There is no particular limitation for the aspect of the another molded article 20 inside the groove 12, but the another molded article 20 is preferably arranged to surround the inorganic filler 11 in the inside of the groove 12 in order to obtain a high anchor effect.

[Another Molded Article 20]

There is no particular limitation for the another molded article 20 as long as it can allow the inorganic filler 11 to enter into the groove 12, in which the inorganic filler 11 is exposed, when uncured, and it may be any of the following: a thermoplastic resin, a curable resin (a thermosetting resin, a photo-curable resin, a radiation curable resin and the like), gum, an adhesive, a metal and the like.

Method of Manufacturing Composite Molded Article 1

The composite molded article 1 can be obtained by not only performing multiple molding but also heat-melting resin molded articles together such as ultrasonic welding, laser welding and high-frequency induction heating welding.

Traditionally, when heat-welding resin molded articles of dissimilar materials together, both a first welding surface of a primary molded article and a second welding surface of a secondary molded article need to be heat-melted. However, in the present invention described herein, heat-melting of the second welding surface alone is sufficient even in a case where the primary molded article and the secondary molded article are formed with dissimilar materials. According to the invention described herein, the following is sufficient: the another resin molded article 20 is press-contacted against the first welding surface on which the groove 12 is pre-formed, and then heat-welding is performed. Therefore, the amount of stray resin will be small, and the composite molded article 1 excellent in both dimensional precision and bonding strength can be obtained.

[Multiple Molding]

Figure 3:
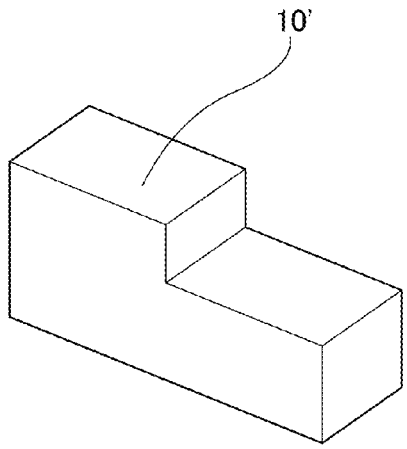
FIG. 3 schematically illustrates how the composite molded article 1 is obtained by multiple molding.
Figure 3:
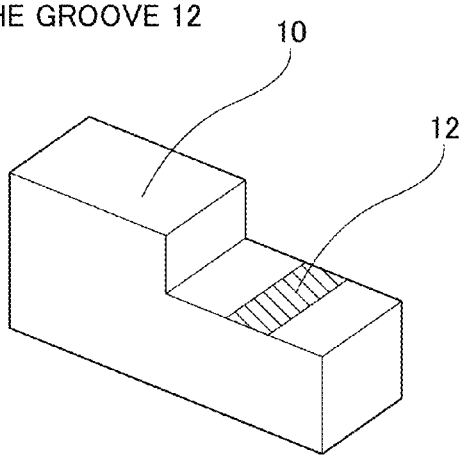
Figure 3:
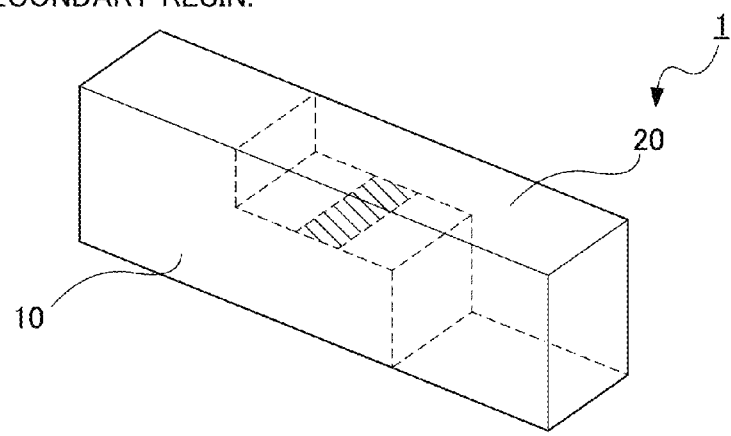

FIG. 3 schematically illustrates how the composite molded article 1 is obtained by multiple molding. First, as shown in (1) of FIG. 3, primary molding of a primary resin is performed to prepare a grooved resin molded article preliminary body 10'. Then, as shown in (2) of FIG. 3, partial resin removal is performed on at least a portion of a surface of the preliminary body 10' to form the groove 12. Thereby, the grooved resin molded article 10 is produced.

Subsequently, as shown in (3) of FIG. 3, the grooved resin molded article 10 is placed into a mold (not shown), and then a secondary resin (an uncured material of the another molded article 20) is charged into the above mold through a surface having the groove 12 arranged as a contact surface, and then the material is cured.

The composite molded article 1 with a curable resin can be obtained by multiple molding via the above step. Further, similarly, the composite molded article 1 with a thermoplastic resin can be obtained by multiple molding when a heat-melted thermoplastic resin is used as the secondary resin.

As described above, in multiple molding, the groove can be easily filled with the secondary resin due to a pressure produced when the secondary resin is charged into the mold, and the secondary resin can be easily arranged to surround the inorganic filler in the inside of the groove.

The grooved molded article 10 has a groove 11, and the another molded article 20 does not have a groove in the following Examples, but the configuration shall not be limited to this. For example, the another molded article 20 may also have a groove. Then, the grooved molded article 10 may be placed at one side of a mold, and the another molded article 20 may be placed at the other side, and then an adhesive composition may be charged between the grooved molded article 10 and the another molded article 20 so that the adhesive composition is allowed to enter into the groove 11 of the grooved molded article 10 and the groove of the another molded article 20. This can allow the grooved molded article 10 to be firmly joined with the another molded article 20 regardless of the type of the adhesive composition and even in a case where the adhesive composition is not perfectly suitable for interlayer adhesion between the grooved molded article 10 and the another molded article 20.

[Ultrasonic Welding]

Figure 4:
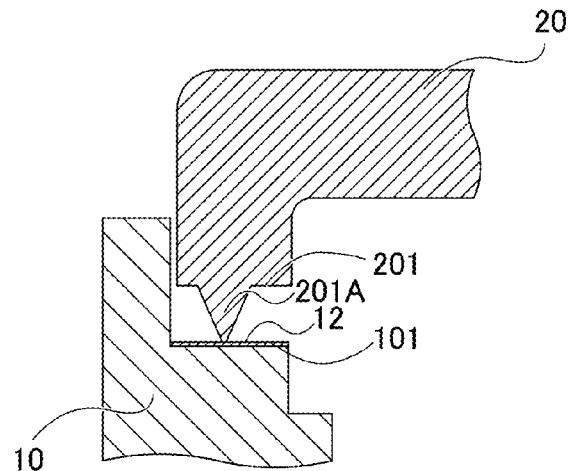
FIG. 4 schematically illustrates how the composite molded article 1 is obtained by ultrasonic welding.
Figure 4:
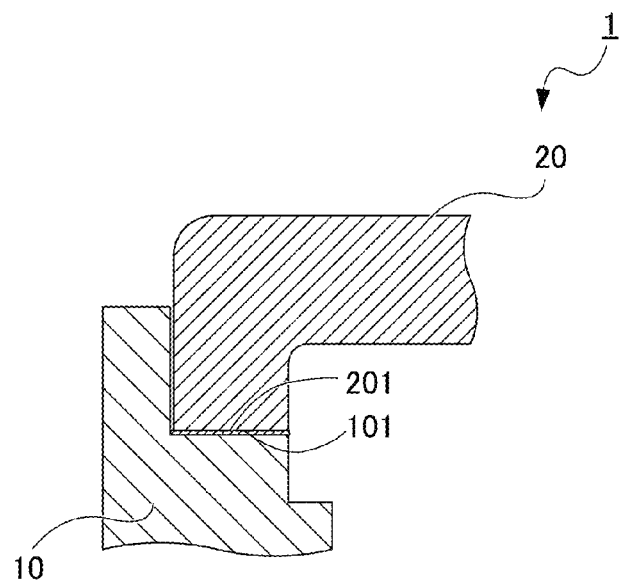

FIG. 4 schematically illustrates how the composite molded article 1 is obtained by ultrasonic welding. First, as shown in (1) of FIG. 4, a second welding surface 201 as a welding surface of the another resin molded article 20 is brought close to a first welding surface 101 as a welding surface of the grooved resin molded article 10.

The first welding surface 101 is a surface having the groove 12. Further, the second welding surface 201 preferably has a convex portion 201A as in the common ultrasonic welding.

Then, as shown in (2) of FIG. 4, the second welding surface 201 is overlaid on the first welding surface 101 so that they are vertically press-contacted, and while maintaining this state, a vibration vertical to the contact surface is generated by ultrasonic wave to perform welding by means of the resulting frictional heat. The composite molded article 1 can be obtained by ultrasonic welding via the above step.

Ultrasonic welding can be performed by using, for example, a ultrasonic welder SONOPET Z-1200 ultrasonic welder from Seidensha Electronics Co., Ltd. In that case, the optimal setting of the subduction amount is preferably determined by observing the conditions of a welding region.

[Laser Welding]

Figure 5:
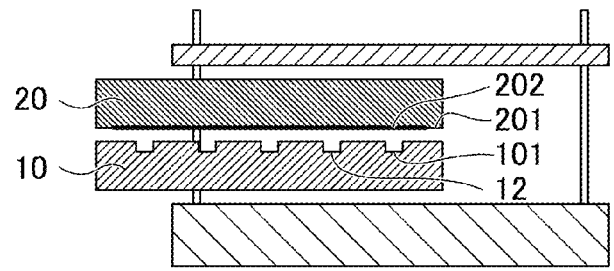
FIG. 5 schematically illustrates how the composite molded article 1 is obtained by laser welding.
Figure 5:
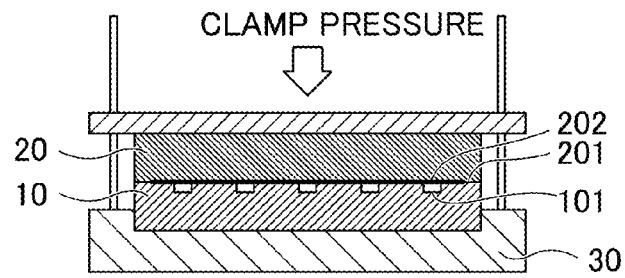
Figure 5:
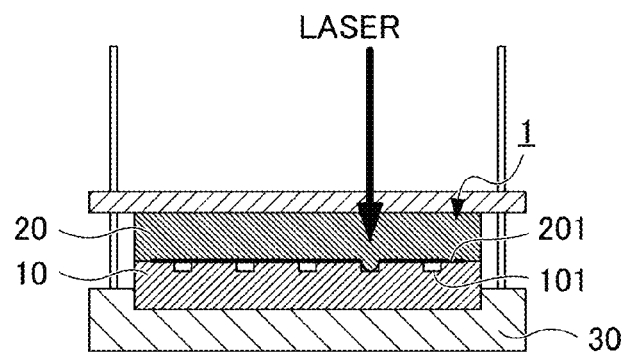

FIG. 5 schematically illustrates how the composite molded article 1 is obtained by laser welding. First, a laser absorbing region 202 is provided on the second welding surface 201 as a welding surface of the another resin molded article 20. The laser absorbing region 202 is obtained by applying a black maker to the second welding surface 201. Note that although the laser absorbing region 202 is provided on the approximately entire surface of the second welding surface 201 in Examples, it is sufficient to be provided only in a region where welding is planned.

Subsequently, as shown in (1) of FIG. 5, the second welding surface 201 as a welding surface of the another resin molded article 20 is allowed to face with the first welding surface 101 as a welding surface of the grooved resin molded article 10.

The first welding surface 101 is a surface having the multiple grooves 12. There is no particular limitation for the shape of the multiple grooves 12, and it may be formed in a stripe-like pattern where the grooves 12 are not crossed, or may be formed in a grid-like pattern where the grooves 12 are crossed. In a case where the grooves 12 are formed in a grid-like pattern, a diagonal grid is preferably formed such that the longer direction of the groove 12 is different from that of the inorganic filler. Further, in a case where the grooves 12 are formed in a grid-like pattern, they may be formed in a rhombo-like pattern.

Although the groove 12 in the first welding surface 101 may be formed on the entire surface of the first welding surface 101, it is sufficient that the groove 12 is formed at a region where the another resin molded article 20 is to be welded.

Subsequently, as shown in (2) of FIG. 5, the second welding surface 201 is overlaid on the first welding surface 101, and press-contacted in a vertical manner with a clamp and the like. Further, as shown in (3) of FIG. 5, laser irradiation is performed on the second welding surface 201 from a surface opposite to the second welding surface 201 of the another resin molded article 20. By this, the another resin molded article 20 in the vicinity of the second welding surface 201 is melted by laser irradiation, and that melted resin enters into the groove 12 due to the force from the above press-contacting to weld the another resin molded article 20 on the grooved resin molded article 10. The composite molded article 1 can be obtained by laser welding via the above step.

Laser irradiation may be performed on one region or may be on multiple regions. In the case of multiple regions, it is preferred to limit the number of irradiating regions to an extent such that the force due to the above press-contacting can be supported. It is also preferred to perform substantially uniform laser irradiation. When applying a large force to a melted resin at the second welding surface 201 to allow it enter into the groove 12 of the grooved resin molded article 10, the force should be supported at a unmelted region of the second welding surface 201. Therefore, in a case where there are too many regions to be irritated, an appropriate force may not be given to the melted resin. Further, in a case where substantially uniform laser is not emitted, distortion may occur at a joining region.

Traditionally, laser welding is performed when welding resin molded articles of similar materials together. In the case of resin molded articles of similar materials, when a secondary molded article receives laser heat to generate heat, that heat is also conducted through the opposite side. Then, in addition to a welding surface of the secondary molded article, a welding surface of a primary molded article is melted to be mixed together. In contrast, when laser welding is tried with resin molded articles of dissimilar materials, only a welding surface of a secondary molded article may be melted, but a welding surface of a primary molded article may not be melted.

According to the present invention, the composite molded article 1 can be obtained even in a case where target resin molded articles are of mutually dissimilar materials as long as a welding surface of a secondary molded article is melted, and that melted resin enters into the groove 12. Further, dimensional stability is excellent since both a primary molded article and a secondary molded article are not melted simultaneously. At this point, the present invention is demonstrated to be based on a novel idea.

[High-Frequency Induction Heating Welding]

Figure 6:
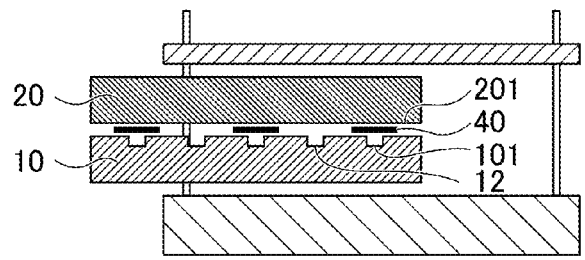
FIG. 6 schematically illustrates how the composite molded article 1 is obtained by high-frequency induction heating welding.
Figure 6:
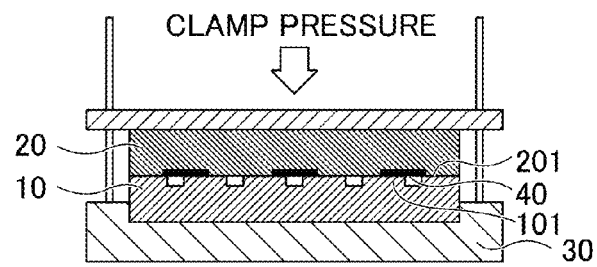
Figure 6:
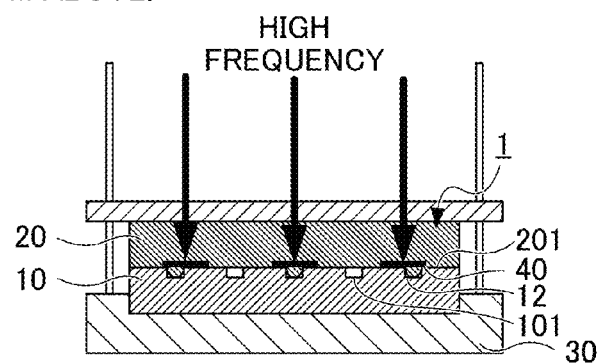

FIG. 6 schematically illustrates how the composite molded article 1 is obtained by high-frequency induction heating welding. First, as shown in (1) of FIG. 6, a heating element 40 is mounted on the first welding surface 101 as a welding surface of the grooved resin molded article 10, on which the another resin molded article 20 is further mounted. At this time, the first welding surface 101 and the second welding surface 201 as a welding surface of the another resin molded article 20 are facing each other. Note that the first welding surface 101 is a surface having the groove 12.

There is no particular limitation for the heating element 40 as long as it has a through hole (not shown), and is of a material which generates heat when high frequency is applied.

The number of through holes may be one, or may be two or more. In the case of two or more, the number of through holes is preferably limited to an extent where the force due to the following press-contacting can be supported. When applying a large force to a melted resin at the second welding surface 201 to allow it to enter into the groove 12 of the grooved resin molded article 10, the force is to be supported at a unmelted region of the second welding surface 201. Therefore, in a case where there are too many through holes, an appropriate force may not be given to the melted resin.

Subsequently, as shown in (2) of FIG. 6, the second welding surface 201 is overlaid on the first welding surface 101, and press-contacted in a vertical manner. Further, as shown in (3) of FIG. 6, high frequency is applied to the second welding surface 201 from a surface opposite to the second welding surface 201 of the another resin molded article 20. Then, the another resin molded article 20 in the vicinity of the second welding surface 201 is melted when high frequency is applied. That melted resin enters into the groove 12 through a through hole of the heating element 40, and the another resin molded article 20 is welded with the grooved resin molded article 10. The composite molded article 1 can be obtained by high-frequency induction heating welding via the above step.

Note that the term "high frequency" as used herein refers to electromagnetic wave which can produce an induced current in a heating element, thereby heating the heating element. Further, the grooved resin molded article and the another resin molded article are press-contacted with each other through flat surfaces in the schematic illustration, but a partially convex configuration may be used, or press-contacting may be performed after heat-melting.

Traditionally, high-frequency induction heating welding is performed when welding resin molded articles of similar materials together. In the case of resin molded articles of similar materials, when a secondary molded article generates heat, that heat is conducted through the opposite side. Then, in addition to a welding surface of the secondary molded article, a welding surface of a primary molded article is melted to be mixed together. In contrast, when high-frequency induction heating welding is tried with resin molded articles of dissimilar materials, only a welding surface of a secondary molded article can be melted, but a welding surface of a primary molded article can not be melted.

According to the present invention, the composite molded article 1 can be obtained even in a case where target resin molded articles are of mutually dissimilar materials as long as a welding surface of a secondary molded article is melted, and that melted resin enters into the groove 12. Further, dimensional stability is excellent since both a primary molded article and a secondary molded article are not melted simultaneously. At this point, the present invention is demonstrated to be based on a novel idea.

EXAMPLES

Below, the present invention will be described in more detail with reference to Examples, but the present invention shall not be limited to these Examples.

Example 1 Comparison of Resins

TABLE 1

| | Resin molded article Resin material | Shape of groove | | Laser irradiation | | Another molded article Material |
| --- | --- | --- | --- | --- | --- | --- |
| | | Width of groove | Distance between grooves | Number of times | Direction | |
| Example | 1-1 PPS with glass fiber | 100 μm | 200 μm | 10 times | Diagonal grid | POM |
| | 1-2 | | | | | PPS with glass fiber |
| | 1-3 PPS with glass fiber·inorganic filler | | | | | POM |
| | 1-4 | | | | | PPS with glass fiber·inorganic filler |
| | 1-5 LCP with glass fiber | | | | | POM |
| | 1-6 | | | | | LCP with glass fiber |
| | 1-7 | | | | | TPE |
| Comparative Example | 1-1 PPS with glass fiber | No groove | | | | POM |
| | 1-2 | | | | | PPS with glass fiber |
| | 1-3 PPS with glass fiber·inorganic filler | | | | | POM |
| | 1-4 | | | | | PPS with glass fiber·inorganic filler |
| | 1-5 LCP with glass fiber | | | | | POM |
| | 1-6 | | | | | LCP with glass fiber |
| | 1-7 | | | | | TPE |

In Table 1, the materials of resins used in resin molded articles are as follows.

PPS with glass fiber: Durafide PPS 1140A7 (Polyplastics Co., Ltd.)

PPS with glass fiber·inorganic filler: Durafide PPS 6165A7 (Polyplastics Co., Ltd.)

LCP with glass fiber: Vectra LCP E130i (Polyplastics Co., Ltd.)

In Table 1, the materials of the another molded article are as follows.

POM: Duracon POM M450-44 (Polyplastics Co., Ltd.)

TPE: Thermolast K_TC4HAZ (KRAIBURG TPE GmbH & Co. KG)

Note that PPS with glass fiber, PPS with glass fiber·inorganic filler and LCP with glass fiber are the same as those listed for resin molded articles.

[Manufacture of Grooved Resin Molded Article]

A resin material containing an inorganic filler shown in Table 1 was injection-molded under the conditions described below to obtain an injection-molded article. The injection-molded article was then irritated with laser for 10 times in a grid-like pattern so that the width of a groove was 100 μm, and the distance between adjacent grooves was 200 μm. Oscillation wavelength: 1.064 μm and maximum rated output: 13 W (the mean) were used, and an output of 90%, a frequency of 40 kHz and a scan rate of 1000 mm/s were used. By this, the grooved resin molded articles according to Example were obtained.

(Conditions for Injection Molding of Durafide)
  Pre-drying: 140° C., 3 hours
  Cylinder temperature: 320° C.
  Mold temperature: 140° C.
  Injection velocity: 20 mm/sec
  Pressure holding: 50 MPa (500 kg/cm$^2$)

(Conditions for Injection Molding of Vectra)
  Pre-drying: 140° C., 4 hours
  Cylinder temperature: 350° C.
  Mold temperature: 60° C.
  Injection velocity: 200 mm/sec
  Pressure holding: 50 MPa (500 kg/cm$^2$)

(Conditions for Injection Molding of Duracon)
  Pre-drying: 80° C., 3 hours
  Cylinder temperature: 190° C.
  Mold temperature: 80° C.
  Injection velocity: 16 mm/sec
  Pressure holding: 80 MPa (800 kg/cm$^2$)

(Conditions for Injection Molding of TPE)
  Pre-drying: 80° C., 3 hours
  Cylinder temperature: 240° C.
  Mold temperature: 25° C.
  Injection velocity: 15 mm/sec
  Pressure holding: 60 MPa (600 kg/cm$^2$)

[Manufacture of Composite Molded Article]

The grooved resin molded articles according to Example were each placed into an injection-molding mold so that a surface having a groove formed by laser irradiation is arranged as a contact surface, and the material of the another molded article shown in Table 1 was injection-molded under the above conditions to obtain a composite molded article according to Example. In contrast, manufacture of composite molded articles was attempted in a similar way using ungrooved molded articles (Comparative Examples 1-1 to 1-7), but all of the combinations resulted in detachment at the joining site, and a composite molded article was not obtained which was joined firmly to an extent where strength and the like could be evaluated.

[Evaluation]
[Observation of Grooved Resin Molded Articles Under Magnification]

Figure 7:
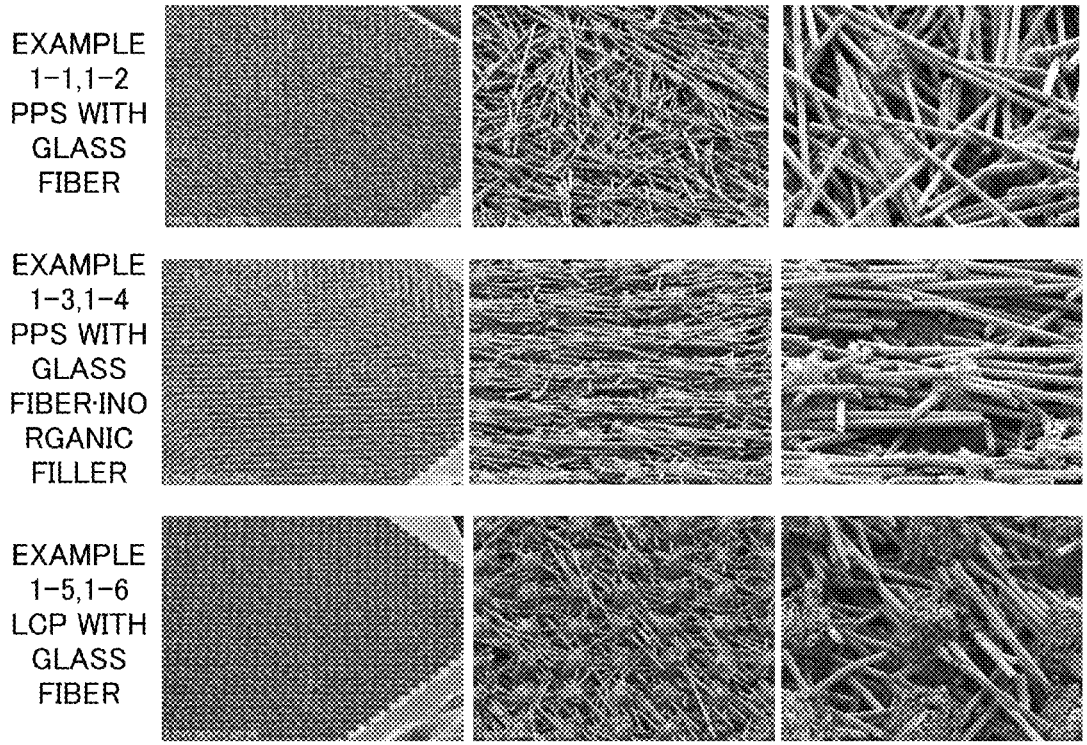
FIG. 7 shows SEM images of the grooved resin molded articles according to Example 1 (comparison of resins).

The grooved resin molded articles according to Example were each observed for a surface having a groove under magnification with an electron microscope (SEM). 3 types of magnification was used. 20 times, 100 times, 300 times. SEM images from Examples 1-1 to 1-6 are shown in FIG. 7, and results from Examples 1-1 to 1-7 are shown in Table 2.

[Depth of Groove]

In order to evaluate the depth of a groove, the grooved resin molded articles according to Example were measured for the depth of a groove by cross-sectional observation. Results are shown in Table 2.

[Strength]

In order to evaluate strength, a failure load was measured for the composite molded articles according to Example. Measurements of a failure load were performed as follows. The measurements were performed with a Tensilon UTA-50 kN (Orientec Co., Ltd.) under the conditions of a crosshead velocity of 1 mm/min. Further, for evaluation, bonding strength was measured by stretching and detaching a composite molded body (120 mm in length, 20 mm in width and 2 mm in thickness). Results are shown in Table 2.

TABLE 2

|  | Observation under magnification | Depth of groove | Strength (Failure load) |
| --- | --- | --- | --- |
| Example1-1 | Glass fiber is exposed on groove surface | 50 μm | 990N |
| Example1-2 | Glass fiber is exposed on groove surface | 100 μm | 1480N |
| Example1-3 | Glass fiber is exposed on groove surface | 50 μm | 780N |
| Example1-4 | Glass fiber is exposed on groove surface | 100 μm | 1380N |
| Example1-5 | Glass fiber is exposed on groove surface | 50 μm | 960N |
| Example1-6 | Glass fiber is exposed on groove surface | 100 μm | 1400N |
| Example1-7 | Glass fiber is exposed on groove surface | 100 μm | 50N |

It was demonstrated that any of the composite molded articles including the grooved resin molded articles according to Example did not show detachment at the joining surface, and were destroyed in a morphology of base material fracture where the another molded articles as secondary molded articles were destroyed, demonstrating the joining regions were firmly joined (Examples 1-1 to 1-7). Further, the following were demonstrated. Each of the grooved resin molded articles according to Example contained an inorganic filler and had multiple grooves formed thereon. Because of the inorganic filler exposed at these multiple grooves, destruction of the grooved resin molded article and the another molded article was significantly prevented in a case where the composite molded article was obtained by integrating the grooved resin molded article with the another molded article through a surface having those grooves arranged as a contact surface (Examples 1-1 to 1-7).

Example 2 Comparison of Number of Times of Laser Irradiation

TABLE 3

| Resin molded article Resin material | Shape of groove | | Laser irradiation | | Another molded article Material |
| --- | --- | --- | --- | --- | --- |
|  | Width of groove | Distance between grooves | Number of times | Direction |  |
| Example 2-1 | LCP with glass fiber | 200 μm | 200 μm | 3 times | Diagonal grid-like | POM |
| Example 2-2 |  |  |  | 5 times |  |  |
| Example 2-3 |  |  |  | 7 times |  |  |
| Example 2-4 |  |  |  | 10 times |  |  |
| Example 2-5 |  |  |  | 15 times |  |  |

[Manufacture of Grooved Resin Molded Article]

The above LCP with glass fiber (Product name: Vectra LCP E130i, Polyplastics Co., Ltd.) was injection-molded under the conditions shown above (the conditions of injection molding) to obtain an injection-molded article. The injection-molded article was then irritated with laser in a diagonal grid-like pattern so that the width of a groove was 100 μm, and the distance between adjacent grooves was 200 μm. The number of times of laser irradiation was as shown in Table 3. Oscillation wavelength: 1.064 μm and maximum rated output: 13 W (the mean) were used, and an output of 90%, a frequency of 40 kHz and a scan rate of 1000 mm/s were used. By this, the grooved resin molded articles according to Example were obtained.

[Manufacture of Composite Molded Article]

The composite molded article was manufactured under the same conditions as those shown in Example 1 for each of the grooved resin molded articles according to Example.

[Evaluation]

Figure 8:
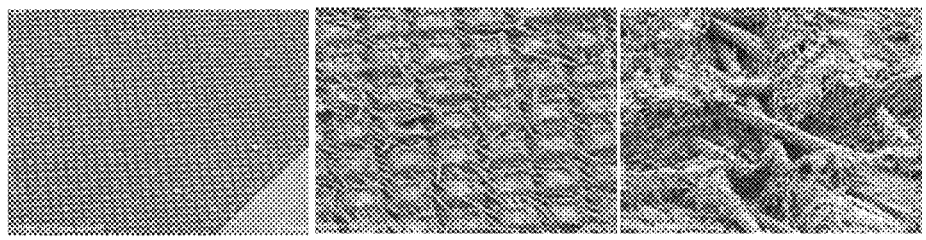
FIG. 8 shows SEM images of the grooved resin molded articles according to Example 2 (comparison of the number of times of laser irradiation).
Figure 8:
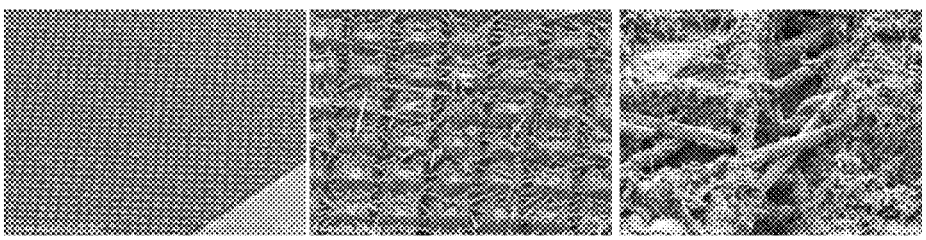
Figure 8:
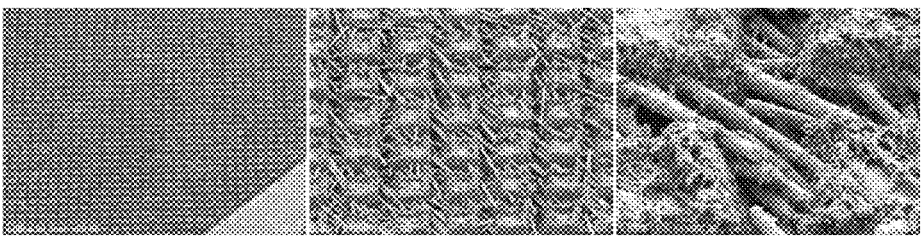
Figure 8:
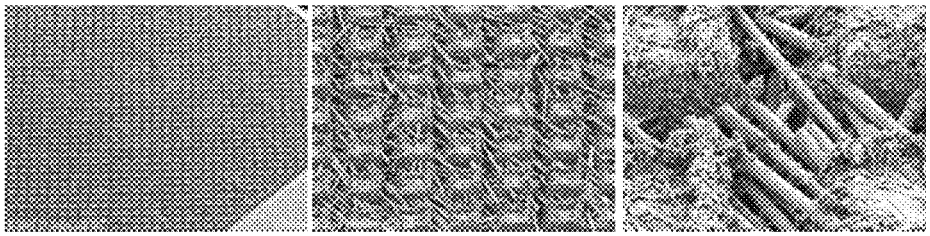
Figure 8:

Observation of the grooved resin molded articles under magnification, the measurements of the depth of a groove and the measurements of strength were performed by the same approaches as those shown in Example 1. Results are shown in FIG. 8 and Table 4.

TABLE 4

|  | Observation under magnification | Depth of groove | Strength (Failure load) |
| --- | --- | --- | --- |
| Example2-1 | Glass fiber is exposed on groove surface | 30 μm | 620N |
| Example2-2 | Glass fiber is exposed on groove surface | 50 μm | 910N |
| Example2-3 | Glass fiber is exposed on groove surface | 70 μm | 1100N |
| Example2-4 | Glass fiber is exposed on groove surface | 100 μm | 1290N |
| Example2-5 | Glass fiber is exposed on groove surface | 130 μm | 1310N |

It was demonstrated that a sufficient failure load was able to be obtained for the grooved resin molded articles according to Example in a case where the composite molded article was obtained by integrating the grooved resin molded article with the another molded article through a surface having the groove arranged as a contact surface (Examples 2-1 to 2-5). In particular, the following were demonstrated. When the depth of a groove is ½ or more of the length of the groove in the shorter direction, the fracture morphology was not delamination fracture but was base material fracture, and a high failure load was able to be obtained in a case where the composite molded article was obtained by integrating the grooved resin molded article with the another molded article through a surface having the groove arranged as a contact surface (Examples 2-3 to 2-5). This appears to be because the unevenness of a groove becomes clear as the number of times of irradiations increases, and as the depth of the groove becomes deep, and the anchor effect of glass fiber exposed in a groove is enhanced.

Example 3 Comparison of Groove Shapes

TABLE 5

| | Resin molded article Resin material | Shape of groove | | | | Another molded article Material |
|---|---|---|---|---|---|---|
| | | Width of groove | Distance between grooves | Laser irradiation | | |
| | | | | Number of times | Direction | |
| Example 3-1 | LCP with glass fiber | 100 μm | 200 μm | 10 times | Diagonal grid-like | POM |
| Example 3-2 | | 100 μm | 200 μm | | Stripe-like perpendicular to longer direction of glass fiber. (Transverse direction) | |
| Example 3-3 | | 100 μm | 200 μm | | Rhombo-like | |
| Example 3-4 | | All | All | | All | |
| Example 3-5 | | 100 μm | 200 μm | | Stripe-like parallel to longer direction of glass fiber. (Longitudinal direction) | |

[Manufacture of Grooved Resin Molded Article]

The above LCP with glass fiber (Product name: Vectra LCP E130i, Polyplastics Co., Ltd.) was injection-molded under the conditions shown above (the conditions of injection molding) to obtain an injection-molded article. The injection-molded article was then irritated with laser with an oscillation wavelength of 1.064 μm in a pattern shown in Table 5 so that the depth of a groove and the distance between adjacent grooves both was as shown in Table 5. The number of times of laser irradiations was 10 times, and the scan rate was 1000 mm/s. By this, the grooved resin molded articles according to Example were obtained.

[Manufacture of Composite Molded Article]

The composite molded article was manufactured under the conditions same as those shown in Example 1 for each of the grooved resin molded articles according to Examples.

[Evaluation]

Figure 9:
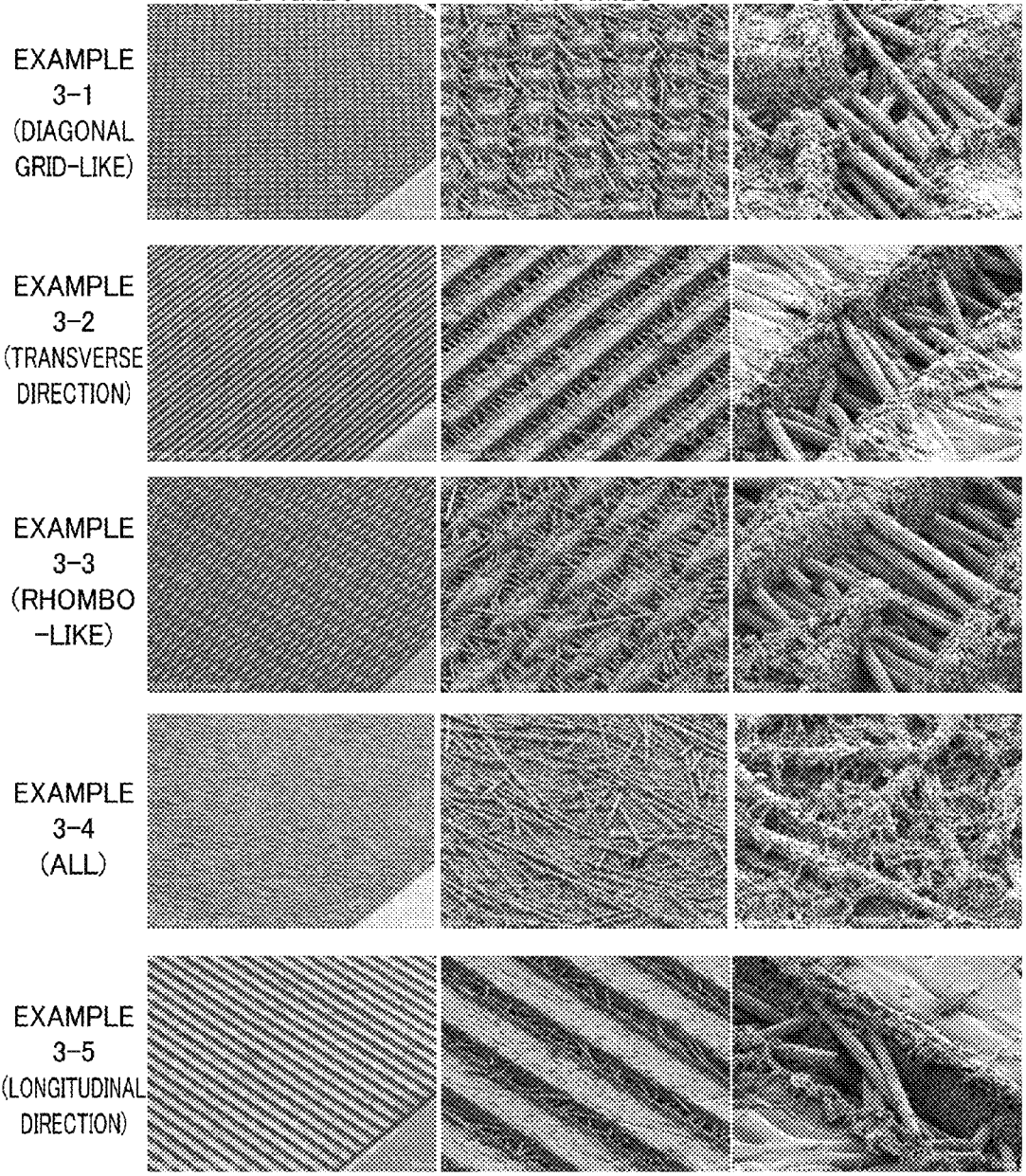
FIG. 9 shows SEM images of the grooved resin molded articles according to Example 3 (comparison of the groove shapes).

Observation of the grooved resin molded articles under magnification, the measurements of the depth of a groove and the measurements of strength were performed by the same approach as those shown in Example 1. Results are shown in FIG. 9 and Table 6.

TABLE 6

| | Observation under magnification | Depth of groove | Strength (Failure load) |
|---|---|---|---|
| Example3-1 | Glass fiber is exposed on groove surface | 150 μm | 1250N |
| Example3-2 | Glass fiber is exposed on groove surface | 150 μm | 1280N |
| Example3-3 | Glass fiber is exposed on groove surface | 150 μm | 1120N |
| Example3-4 | Glass fiber is exposed on groove surface | 150 μm | 520N |
| Example3-5 | Glass fiber is exposed on groove surface | 150 μm | 770N |

It was demonstrated that a sufficient failure load was able to be obtained for the grooved resin molded articles according to Examples when the composite molded article was obtained by integrating the grooved resin molded article with the another molded article through a surface having the groove arranged as a contact surface (Examples 3-1 to 3-5). In particular, the following were demonstrated. In a case where laser irradiation was performed in a direction different from the longer direction of the glass fiber when the inorganic filler was fibrous, and the length of the inorganic filler in the longer direction is longer than that of the groove in the shorter direction, a failure load much higher than 1000 N was able to be obtained in a case where the composite molded article was obtained by integrating the grooved resin molded article with the another molded article through a surface having the groove arranged as a contact surface (Examples 3-1 to 3-3). This appears to be because the glass fiber is arranged to bridge the grooves, and the anchor effect is fully achieved.

Figure 10:
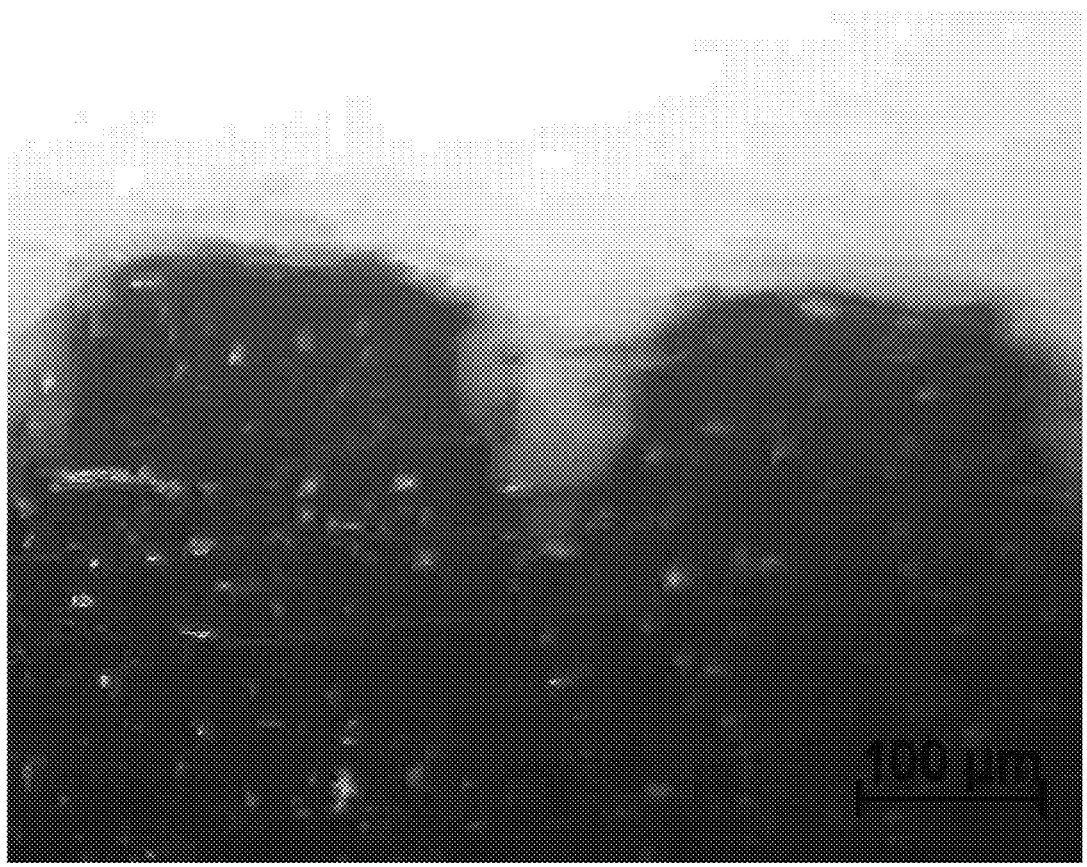
FIG. 10 shows a SEM image of a cross section of a composite molded article in which the grooved resin molded article according to Example 3-2 is used.

In addition, an image of a cross section was taken for the composite molded article including the grooved resin molded article according to Example 3-2. Results are shown in Table 10. FIG. 10 shows that the glass fiber is projected from the side surface of a groove, and the inside of the groove is filled with a resin of the secondary molded article in a manner where it surrounds the glass fiber.

Example 4 Comparison of Distance Between Grooves, No. 1 (Shape of Groove: Diagonal Grid)

TABLE 7

| | Resin molded article Material | Width of groove | Shape of groove Distance between grooves | Valley:Crest | Laser irradiation Number of times | Direction | Another molded article Material |
|---|---|---|---|---|---|---|---|
| Example 4-1 | LCP with glass fiber | 200 μm | 50 μm | 1:0.25 | 10 times | Diagonal grid-like | POM |
| Example 4-2 | | | 100 μm | 1:0.5 | | | |
| Example 4-3 | | | 150 μm | 1:0.75 | | | |
| Example 4-4 | | | 200 μm | 1:1 | | | |
| Example 4-5 | | | 300 μm | 1:1.5 | | | |
| Example 4-6 | | | 400 μm | 1:2 | | | |
| Example 4-7 | | | 600 μm | 1:3 | | | |
| Example 4-8 | | | 800 μm | 1:4 | | | |

[Manufacture of Grooved Resin Molded Article]

The above LCP with glass fiber (Product name: Vectra LCP E130i, Polyplastics Co., Ltd.) was injection-molded under the conditions shown above (the conditions of injection molding) to obtain an injection-molded article. The injection-molded article was then irritated with laser with an oscillation wavelength of 1.064 μm in a diagonal grid-like pattern so that the depth of a groove was 200 μm, and the distance between adjacent grooves was as shown in Table 7. The number of times of laser irradiation was 10 times, and the scan rate was 1000 mm/s. By this, the grooved resin molded articles according to Example were obtained.

[Manufacture of Composite Molded Article]

The composite molded article was manufactured under the same conditions as those shown in Example 1 for each of the grooved resin molded articles according to Examples.

[Evaluation]

Observation of the grooved resin molded article under magnification, the measurements of the depth of a groove and the measurements of strength were performed by the same approaches as those shown in Example 1. As an example, results from observation of the grooved resin molded articles according to Examples 4-1 to 4-4 under magnification are shown in FIG. 11 and Table 8. Further, results from measurements of groove depth and strength for all of the grooved resin molded articles according to Example are shown in Table 8. Form the results from the observation under magnification in FIG. 11, the orientation direction of the glass fiber exposed on the surface of the groove can be seen. Further, in a case where grooves are provided in a grid-like pattern, a resin remaining as protrusions on a surface does not interfere with the observation of the inorganic filler as long as the distance between grooves is 150 μm or less.

TABLE 8

| | Observation under magnification | Depth of groove | Strength (Failure load) |
|---|---|---|---|
| Example4-1 | Glass fiber is exposed on groove surface | 150 μm | 580N |

TABLE 8-continued

| | Observation under magnification | Depth of groove | Strength (Failure load) |
|---|---|---|---|
| Example4-2 | Glass fiber is exposed on groove surface | 150 μm | 680N |
| Example4-3 | Glass fiber is exposed on groove surface | 150 μm | 860N |
| Example4-4 | Glass fiber is exposed on groove surface | 150 μm | 1250N |
| Example4-5 | Undetermined | 150 μm | 1080N |
| Example4-6 | Undetermined | 150 μm | 1030N |
| Example4-7 | Undetermined | 150 μm | 870N |
| Example4-8 | Undetermined | 150 μm | 790N |

It was demonstrated that a sufficient failure load was able to be obtained for the grooved resin molded articles according to Example in a case where the composite molded article was obtained by integrating the grooved resin molded article with the another molded article through a surface having the groove arranged as a contact surface (Examples 4-1 to 4-8). In particular, the following were demonstrated. When the distance between adjacent grooves is from 1 time to 2 times of the width of the groove (in the case of a valley:protrusion of 1:1 to 1:2), a failure load of 900 N or more was able to be obtained in a case where the composite molded article was obtained by integrating the grooved resin molded article with the another molded article through a surface having the groove arranged as a contact surface (Examples 4-4 to 4-6). This appears to be because both the grooved resin molded article and the another molded article can be enforced in an approximately uniform manner in a case where the width of a valley and the width of a protrusion are approximately the same.

Example 5 Comparison of Distance Between Grooves, No. 2 (Shape of Groove: Traverse Direction)

TABLE 9

| Example number | Resin molded article Material | Shape of groove | | | Laser irradiation | | Another molded article Material |
|---|---|---|---|---|---|---|---|
| | | Width of groove | Distance between grooves | Valley:Crest | Number of times | Direction | |
| 5-1 | LCP with glass fiber | 200 μm | 50 μm | 1:0.25 | 10 times | Stripe-like perpendicular to longer direction of glass fiber. (Transverse direction) | POM |
| 5-2 | | | 100 μm | 1:0.5 | | | |
| 5-3 | | | 150 μm | 1:0.75 | | | |
| 5-4 | | | 200 μm | 1:1 | | | |
| 5-5 | | | 300 μm | 1:1.5 | | | |
| 5-6 | | | 400 μm | 1:2 | | | |

[Manufacture of Grooved Resin Molded Article]

The above LCP with glass fiber (Product name: Vectra LCP E130i, Polyplastics Co., Ltd.) was injection-molded under the conditions shown above (the conditions of injection molding) to obtain an injection-molded article. The injection-molded article was then irritated with laser with an oscillation wavelength of 1.064 μm in a diagonal grid-like pattern so that the depth of a groove was 200 μm, and the distance between adjacent grooves was as shown in Table 9. The number of times of laser irradiation was 10 times, and the scan rate was 1000 mm/s. By this, the grooved resin molded articles according to Example were obtained.

[Manufacture of Composite Molded Article]

The composite molded article was manufactured under the same conditions as those shown in Example 1 for each of the grooved resin molded articles according to Example.

[Evaluation]

Observation of the grooved resin molded article under magnification, the measurements of the depth of a groove and the measurements of strength were performed by the same approaches as those shown in Example 1. Results are shown in FIG. 12 and Table 10. From the results from the observation under magnification in FIG. 12, the orientation direction of the glass fiber exposed on the surface of the groove can be seen. Further, in a case where grooves are provided in one direction, a resin remaining as protrusions on a surface does not interfere with the observation of the inorganic filler as long as the distance between grooves is 50 μm or less.

TABLE 10

| | Observation under magnification | Depth of groove | Strength (Failure load) |
|---|---|---|---|
| Example5-1 | Glass fiber is exposed on groove surface | 150 μm | 420N |
| Example5-2 | Glass fiber is exposed on groove surface | 150 μm | 750N |
| Example5-3 | Glass fiber is exposed on groove surface | 150 μm | 1130N |
| Example5-4 | Glass fiber is exposed on groove surface | 150 μm | 1280N |
| Example5-5 | Glass fiber is exposed on groove surface | 150 μm | 1000N |
| Example5-6 | Glass fiber is exposed on groove surface | 150 μm | 910N |

It was demonstrated that a sufficient failure load was able to be obtained for the grooved resin molded articles according to Example in a case where the composite molded article was obtained by integrating the grooved resin molded article with the another molded article through a surface having the groove arranged as a contact surface (Examples 5-1 to 5-6). In particular, the following were demonstrated. When the distance between adjacent grooves is from 1 time to 2 times of the width of the groove (in the case of a valley:protrusion of 1:1 to 1:2), a failure load of 900 N or more was able to be obtained in a case where the composite molded article was obtained by integrating the grooved resin molded article with the another molded article through a surface having the groove arranged as a contact surface (Examples 5-4 to 5-6). This appears to be because both the grooved resin molded article and the another molded article can be enforced in an approximately uniform manner in a case where the width of a valley and the width of a protrusion are approximately the same.

Example 6 Comparison of Composite Molded Articles

TABLE 11

| | Resin molded article Resin Material | Shape of groove | | Laser irradiation | | Another molded article Material |
|---|---|---|---|---|---|---|
| | | Width of groove | Distance between grooves | Number of times | Direction | |
| Example 6 | LCP with glass fiber | 200 μm | 200 μm | 10 times | Diagonal grid-like | LCP |
| Comparative Example 6 | LCP with glass fiber | None | None | None | None | LCP |

[Manufacture of Grooved Resin Molded Article]

The above LCP with glass fiber (Product name: Vectra LCP S135, Polyplastics Co., Ltd.) was injection-molded under the conditions shown above (the conditions of injection molding) to obtain an injection-molded article. The injection-molded article was then irritated with laser with an oscillation wavelength of 1.064 μm in a diagonal grid-like pattern so that the depth of a groove was 200 μm, and the distance between adjacent grooves was 200 μm. The number of times of laser irradiations was 10 times, and the scan rate was 1000 mm/s. By this, the grooved resin molded article according to Example 6 was obtained.

Meanwhile, the above LCP with glass fiber (Product name: Vectra LCP 5135, Polyplastics Co., Ltd.) itself was taken as a resin molded article according to Comparative Example 6.

[Manufacture of Composite Molded Article]

Each of the resin molded articles according to Example 6 and Comparative Example 6 was joined with Vectra LCP 5135 (Polyplastics Co., Ltd.) by ultrasonic welding using a surface having grooves as the first welding surface to obtain composite molded articles according to Examples. Ultrasonic welding was performed with a ultrasonic welder SONOPET Σ-1200 ultrasonic welder from Seidensha Electronics Co., Ltd. under the conditions of a subduction setting amount of 0.8 mm, a frequency of ultrasonic wave of 20 kHz, an amplitude of 60 μm and an air pressure of 0.1 MPa.

Similarly, each of the resin molded articles according to Comparative Example 6 was joined with Vectra LCP 5135 (Polyplastics Co., Ltd.) by ultrasonic welding under the conditions described above to produce composite molded articles according to Comparative Example 6.

[Measurement of Failure Load]

In order to evaluate strength, a failure load was measured for each of the resin molded articles according to Example and Comparative Example. Measurements of a failure load were performed as follows. The measurements were performed with a Tensilon UTA-50 kN (Orientec Co., Ltd.) under the conditions of a crosshead velocity of 1 mm/min. Results are shown in Table 12.

TABLE 12

|  | Composite molded article Failure load |
| --- | --- |
| Example 6 | 1700N |
| Comparative Example 6 | 1200N |

It was demonstrated that the grooved resin molded article according to Example 6 showed a higher failure load than the ungrooved resin molded articles in a case where the composite molded article was obtained by integrating the grooved resin molded article with the another molded article through a surface having the groove arranged as a contact surface.

EXPLANATION OF REFERENCE NUMERALS

1 Composite molded article
10 Grooved resin molded article
11 Inorganic filler
12 Groove
12a Side surface of groove
13 Protrusions
20 Another molded article

The invention claimed is:

1. A composite molded article comprising a grooved resin molded article and another molded article,
wherein the grooved resin molded article comprises:
    a fibrous inorganic filler;
    at least one groove; and
    a first protrusion on a first side of the at least one groove and a second protrusion on a second side of the at least one groove,
    wherein the fibrous inorganic filler has a mean fiber length longer than a width of the groove, such that the fibrous inorganic filler can contact both the first protrusion and the second protrusion across the at least one groove,
wherein the other molded article is adjoined on a surface having the at least one groove of the grooved resin molded article; and
wherein the other molded article is arranged to surround the inorganic filler in the inside of the at least one groove,
wherein the grooved resin molded article comprises a plurality of grooves, and the distance between adjacent grooves is the same or more as the width of the at least one groove and twice the width or less of the at least one groove.

2. The composite molded article according to claim 1, wherein the inorganic filler is projected from a surface at a side of the at least one groove.

3. The composite molded article according to claim 1, wherein the depth of the at least one groove is ½ or more of the length of the at least one groove in a shorter direction.

4. The composite molded article according to claim 1, wherein the fibrous inorganic filler is glass fiber.

5. The composite molded article according to claim 1, wherein the at least one groove is formed by laser irradiation.

6. The composite molded article according to claim 1, wherein the at least one groove is intermittently formed.

7. A method of manufacturing the composite molded article according to claim 1, comprising:
    manufacturing the grooved resin molded article by a method comprising forming the at least one groove by partially removing a resin in a resin molded article containing a fibrous inorganic filler such that the inorganic filler is exposed from a side surface of the at least one groove, wherein the at least one groove is formed in a direction different from the direction of the length of the fibrous inorganic filler; and
    adjoining the other molded article on the surface having the at least one groove of the grooved resin molded article so as to surround the inorganic filler in the inside of the at least one groove.

8. The method of manufacturing the composite molded article according to claim 7, where the at least one groove is in a plurality of numbers.

9. The method of manufacturing the composite molded article according to claim 7, wherein the partial removal of a resin is performed by laser irradiation.

10. The method of manufacturing the composite molded article according to claim 9, wherein the laser irradiation is repeated for multiple times in the groove forming step.

11. The method of manufacturing the composite molded article according to claim 10, comprising a step of increasing the level of laser irradiation relative to the previous irradiation level when the laser irradiation is repeated for multiple times.

12. The method of manufacturing the composite molded article according to claim 9, wherein the laser irradiation is performed from a direction other than that perpendicular to a surface of the molded article.

13. The method of manufacturing a composite molded article according to claim 7, wherein the integration is performed by injection molding.

14. A method of manufacturing the composite molded article according to claim 7, wherein the other molded article is adjoined by injection molding through the surface having the at least one groove arranged as a contact surface to manufacture the composite molded article.

15. The composite molded article according to claim 1, wherein
a longer direction of the inorganic filler is different from that of the at least one groove, and
the length of the at least one groove in a shorter direction is shorter than that of the inorganic filler in the longer direction.

* * * * *